L. E. MacBRYDE.
RELIEF VALVE.
APPLICATION FILED FEB. 28, 1919.

1,343,735.

Patented June 15, 1920.
2 SHEETS—SHEET 1.

WITNESS:

INVENTOR:
Louis E. MacBryde,
BY
Russell M. Everett,
ATTORNEY.

L. E. MacBRYDE.
RELIEF VALVE.
APPLICATION FILED FEB. 28, 1919.
1,343,735.
Patented June 15, 1920
2 SHEETS—SHEET 2.
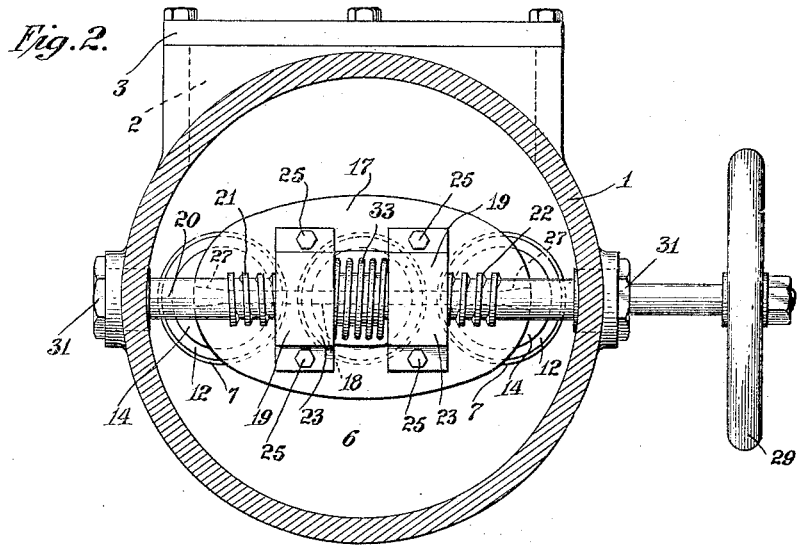
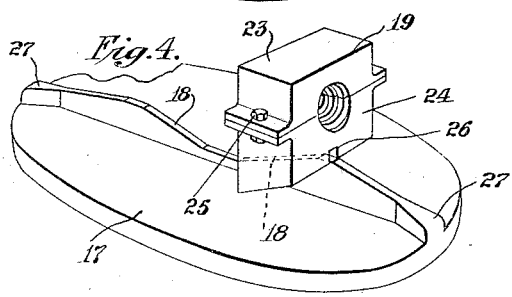
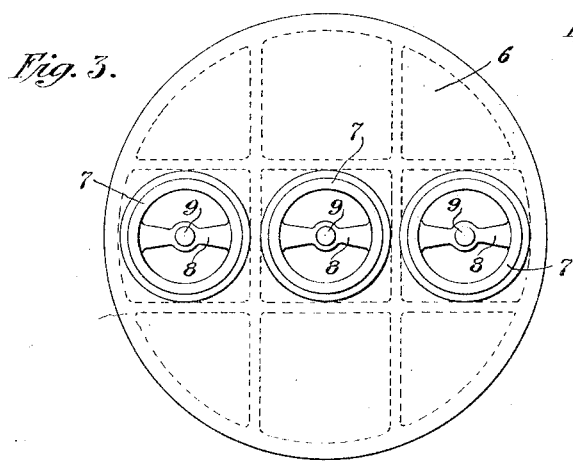
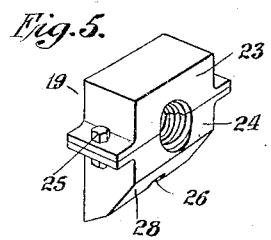
WITNESS:
INVENTOR:
Louis E. MacBryde,
BY
Russell M. Everett,
ATTORNEY.

UNITED STATES PATENT OFFICE.

LOUIS E. MacBRYDE, OF NEWARK, NEW JERSEY, ASSIGNOR TO GEORGE SNYDER, OF FOSTORIA, OHIO.

RELIEF-VALVE.

1,343,735. Specification of Letters Patent. Patented June 15, 1920.

Application filed February 28, 1919. Serial No. 279,863.

*To all whom it may concern:*

Be it known that I, LOUIS E. MACBRYDE, a citizen of the United States, and a resident of Newark, in the county of Essex and State of New Jersey, have invented new and useful Improvements in Relief-Valves, of which the following is a specification.

This invention relates to that class of relief valves which are known as back pressure valves or atmospheric relief valves, and which are employed for preventing the accumulation of excessive pressure. For example, where exhaust steam is employed to heat a building and provision is made for the entry of live steam into said system when necessary, it is customary to provide such heating system with a relief pipe leading to the roof or the like and to insert in such relief pipe a back pressure valve which will open in case of an accident or the like which might cause the live steam to be supplied at a pressure too high for the heating system. It will be understood by those skilled in the art that the normal pressure of such a heating system is about five pounds, and that the live steam which is introduced is reduced from three hundred pounds more or less, so that if the reducing valve should get out of order, the results would be disastrous except for such a back pressure valve as I have mentioned. Valves of this type are also used where it is desired to maintain a vacuum, such as on a condenser, with vacuum pans or the like, and obtain relief should anything happen that would result in loss of vacuum and the accumulation of pressure. In that case the valve is of course set to open under a quarter of a pound or other small pressure and afford a communication with the atmosphere.

I mention these two uses only by way of illustration, and of course without restricting my improved valve for any purpose to which it is adapted.

The objects of my invention are to secure a back pressure or atmospheric relief valve which will operate under a wide range of pressures; to secure a valve which will not chatter and will be noiseless; to provide the valve, for this purpose, with a plurality of individual ports each controlled by a spring valve; to thus enable one or more ports to open according to the amount of pressure to be relieved; to enable all the spring valves to be set at once and by a single operation; to prevent the springs from becoming distorted or set, and facilitate keeping them alined; to secure a main shaft or stem, and setting means, which will not be forced out of place by improper manipulation of the valve; to provide a water seal for the valve, and to obtain other advantages and results as may be brought out in the following description.

Referring to the accompanying drawings, in which like numerals of reference indicate the same parts throughout the several views, Figure 1 is a central sectional view of a valve of my improved construction;

Fig. 2 is a plan of the same in section on line 2—2, Fig. 1;

Fig. 3 is a plan view of the valve seat plate with the seat rings therein;

Fig. 4 is a perspective view of the setting plate, with one of the traveling wedges thereon, and Fig. 5 is a perspective view of a modified form of traveling wedge.

Figure 1:
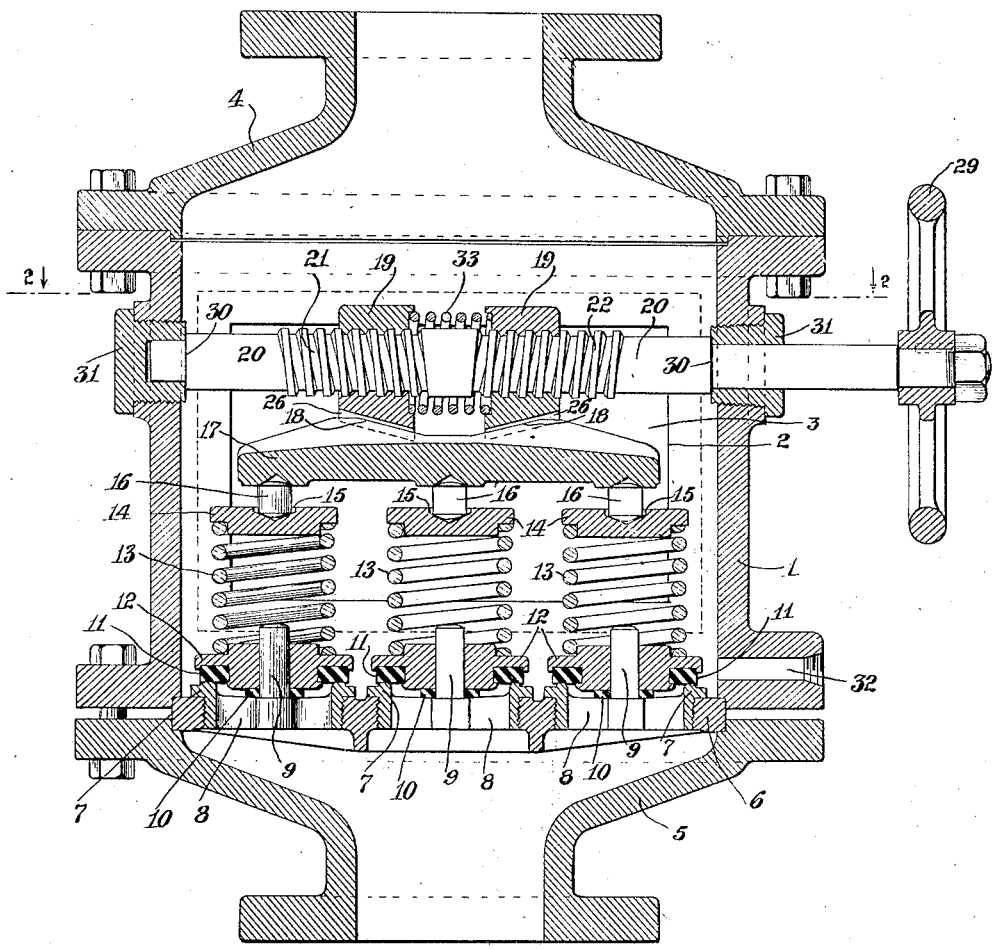

In the specific embodiment of the invention shown in said drawings, 1 indicates the body portion of the valve, provided at one side with a hand hole 2 and cover 3 therefor to permit access to the interior chamber and parts therein. A top 4 and a bottom 5 are bolted to the body portion 1 and adapted to receive suitable pipe connections.

Between the body portion 1 and bottom 5 is clamped a plate 6, which I have shown providing a transverse row of three valve seats 7 screwed into the plate, that number or less having been found best adapted to my purpose. Each of these valve seats 7 has a spider bar 8 providing a stem 9, said stem being surrounded by a buffer 10 of rubber or the like, and the valve seat also has a similar gasket 11. A valve 12 is adapted to seat on said gasket and form an impervious joint therewith, said valve being centrally apertured to slide on the stem 9 and engage the buffer 10 thereon so that it will close imperviously and noiselessly. For closing the valve, a spring 13 seats against its upper side and receives at its top a spring bearing 14 recessed at its upper side as at 15 for a pin 16 which engages at its opposite end the setting plate 17. It will be understood that this setting plate has at its under side as many sockets as there are valves, to receive the pins 16 thereon, and that by adjusting such setting plate the pressure against which the valves will open is determined.

For adjusting the setting plate 17, the same is provided at its top with oppositely inclined track portions 18, 18, which are in line with each other and adapted to slidably receive the lower ends of adjusting wedges 19, 19 which are capable of being moved toward or away from each other by means of a main shaft 20 having right and left hand threaded portions 21, 22 engaging said wedges. The traveling wedges are preferably made in upper and lower sections 23, 24, so as to be more easily applied to the threaded shaft, said sections being bolted together as at 25, 25. The lower ends of the wedges are grooved, as at 26, to receive the track and prevent lateral displacement, and it will be understood that as the main shaft 20 is turned the wedges will be forced apart to ride up the track portions 18 and thus compress the springs 13 or will be drawn together moving down the track portions 18, 18 and allowing the springs to expand. In this way the springs can be set for their valves to open against any desired pressure within limits.

Preferably the tracks 18, 18 widen at their outer ends 27, for greater strength, and in case of excessive friction from engagement of the wedges with the track I may bevel the lower outer sides of the traveling wedges as shown at 28 in Fig. 5.

In the operation of my improved valve it is set by means of the main shaft 20 and wheel 29 on the outer end thereof so as to give the springs the desired tension, which in case the valve is used as a back pressure valve in a heating system will be from three to ten or fifteen pounds, according to the demands upon the heating system, and in the case of an atmospheric relief valve for vacuum purposes will be only a quarter of a pound or so. Then if the pressure beneath the valves 12 becomes excessive one of them will open first, and more as they are needed, until if necessary they are all open, in which case the combined openings will exceed the capacity of the pipe leading into the lower end of the valve, as designed and constructed. By having a plurality of individual valves, I avoid the very slight opening of a large and heavy valve such as would cause chattering, and thus the operating of my improved valve is noiseless. Furthermore, the individual springs are lighter and easier to keep alined, and in proper form and shape, than is a single very heavy spring. It will be understood that in practice the three springs 13, as commercially produced, will vary enough to insure opening of the three individual valves other than simultaneously or all at once.

The main shaft 20 I have shown journaled by reduced portions of itself in the opposite walls of the body portion 1 of the valve casing so that shoulders 30, 30 on said shaft lie inside said bearings contiguous to the same and prevent longitudinal displacement of the shaft in case it is turned excessively by the wheel 20 or otherwise improperly manipulated. In order to insert the shaft and keep its bearings against said shoulders. I have shown it journaled in bushings 31, 31 in the body portion walls, and it will be understood that the wheel 29 may be of any suitable kind known to the art for operating valves.

To afford an outlet for any water of condensation which gathers above the valve seat plate 6 I have shown a drain 32 through the wall of the body portion of the valve, threaded at its outer end to receive a suitable pipe connection. Preferably this drain is located enough above the valve seats so that a little water will be retained and stand above the level of the seats to afford a seal, particularly in cases where the valve is employed for maintaining a vacuum.

The traveling wedges 19, 19 preferably have between themselves a spring to take up any looseness of said wedges upon their threaded portions of the shaft 20, and I have shown for this purpose a helical spring 33 loose on the shaft and engaging the traveling wedges at its opposite ends to force them apart.

Obviously detail modifications and changes may be made in manufacturing my improved valve without departing from the spirit and scope of the invention, and I do not wish to be understood as limiting myself except as required by the following claims when construed in the light of the prior art.

Having thus described the invention, what I claim is:

1. In a relief valve, the combination with a body portion, of a transverse plate providing a plurality of valve seats, valves for said seats, springs one for each of said valves normally holding the same seated, a setting plate having a rib with oppositely inclined portions, traveling wedges grooved to receive said inclined portions, and means for moving said wedges.

2. In a relief valve, the combination with a body portion, of a transverse plate providing a plurality of valve seats, valves for said seats, springs one for each of said valves normally holding the same seated, a setting plate having oppositely inclined track portions, traveling wedges engaging said track portions, a shaft having right and left hand threaded portions receiving said wedges, and a spring between said wedges holding them against looseness.

3. In a relief valve, the combination with a body portion, of a transverse plate providing a plurality of valve seats, valves for said seats, springs one for each of said valves normally holding the same seated, a setting plate having oppositely inclined track portions, traveling wedges engaging said track portions, a shaft having right and left hand threaded portions receiving said wedges, and a spring on said shaft engaging said wedges at its opposite ends.

4. In a relief valve, the combination with a body portion, of a transverse plate providing a plurality of valve seats, valves for said seats, springs one for each of said valves, spring bearings one for each of said springs and centrally socketed, a setting plate having sockets one opposite each of said spring bearing sockets, pins each having its ends engaging opposite spring bearing and setting plate sockets, and means for forcing said setting plate toward the valve seat plate.

5. In a relief valve, the combination with a body portion, of a transverse plate providing a plurality of valve seats, valves for said seats, springs one for each of said valves, spring bearings one for each of said springs, a setting plate, pins each having its ends engaging one of said spring bearings and the setting plate, and means for forcing said setting plate toward the valve seat plate.

6. In a relief valve, the combination with a body portion, of a transverse plate providing a plurality of valve seats each having a central stem, annular buffers one at the base of each of said stems, valves for said seats slidable on said stems and engaging said buffers, springs one for each of said valves normally holding the same seated, and means for seating all said springs simultaneously.

LOUIS E. MacBRYDE.